(12) United States Patent
Lavalaye et al.

(10) Patent No.: US 10,246,609 B2
(45) Date of Patent: Apr. 2, 2019

(54) PIGMENTED COATING MATERIAL AND PROCESS FOR PRODUCING A MULTI-COAT PAINT SYSTEM USING THE PIGMENTED COATING MATERIAL

(71) Applicant: BASF Coatings GmbH, Münster (DE)

(72) Inventors: Jorn Lavalaye, Würzburg (DE); Carmen Kunszt, Hammelburg (DE); Norbert Löw, Neustadt/Aisch (DE)

(73) Assignee: BASF Coatings GmbH, Muenster (DE)

( * ) Notice: Subject to any disclaimer, the term of this patent is extended or adjusted under 35 U.S.C. 154(b) by 638 days.

(21) Appl. No.: 14/380,293

(22) PCT Filed: Feb. 27, 2013

(86) PCT No.: PCT/EP2013/053887
§ 371 (c)(1),
(2) Date: Aug. 21, 2014

(87) PCT Pub. No.: WO2013/127826
PCT Pub. Date: Sep. 6, 2013

(65) Prior Publication Data
US 2015/0044452 A1 Feb. 12, 2015

Related U.S. Application Data

(60) Provisional application No. 61/603,989, filed on Feb. 28, 2012.

(30) Foreign Application Priority Data

Feb. 28, 2012 (EP) ..................................... 12157332

(51) Int. Cl.
| | | |
|---|---|---|
| C09D 179/04 | (2006.01) | |
| C09D 5/38 | (2006.01) | |
| C09D 7/20 | (2018.01) | |
| C09D 7/41 | (2018.01) | |

(52) U.S. Cl.
CPC ............. *C09D 179/04* (2013.01); *C09D 5/38* (2013.01); *C09D 7/20* (2018.01); *C09D 7/41* (2018.01); *Y10T 428/264* (2015.01); *Y10T 428/31678* (2015.04)

(58) Field of Classification Search
CPC .......... C09D 179/04; C09D 5/38; C09D 7/20; C09D 7/41; Y10T 428/264; Y10T 428/31678
USPC ...... 428/335, 457; 524/315, 376; 427/385.5, 427/388.2, 393.5
See application file for complete search history.

(56) References Cited

U.S. PATENT DOCUMENTS

| | | |
|---|---|---|
| 3,479,328 A | 11/1969 | Nordstrom |
| 3,674,838 A | 7/1972 | Nordstrom |
| 4,126,747 A | 11/1978 | Cowherd, III et al. |
| 4,279,833 A | 7/1981 | Culbertson et al. |
| 4,340,497 A | 7/1982 | Knopf |
| 4,914,148 A | 4/1990 | Hilla et al. |
| 5,256,543 A | 10/1993 | Heithorn et al. |
| 5,368,944 A | 11/1994 | Hartung et al. |
| 5,977,258 A | 11/1999 | Hille et al. |
| 6,001,915 A | 12/1999 | Schwarte et al. |
| 6,538,059 B1 | 3/2003 | Muller et al. |
| 6,632,915 B1 | 10/2003 | Schwarte et al. |
| 6,737,468 B1 | 5/2004 | Bremser |
| 6,770,702 B1 | 8/2004 | Muller et al. |
| 2011/0097482 A1* | 4/2011 | December et al. ........... 427/160 |
| 2012/0034457 A1 | 2/2012 | Low et al. |
| 2012/0034468 A1* | 2/2012 | Low et al. .................... 428/413 |

FOREIGN PATENT DOCUMENTS

| | | |
|---|---|---|
| DE | 19930665 | 1/2001 |
| DE | 10-2006-053776 | 5/2008 |
| EP | 0228003 | 7/1987 |
| EP | 0480959 | 4/1992 |
| EP | 0574417 | 12/1993 |
| EP | 0787159 | 8/1997 |
| EP | 1173491 | 1/2002 |
| EP | 1185568 | 3/2002 |
| WO | WO-91/00895 | 1/1991 |
| WO | WO-92/15405 | 9/1992 |
| WO | WO-96/12747 | 5/1996 |
| WO | WO-96/24619 | 8/1996 |
| WO | WO-99/42529 | 8/1999 |
| WO | WO-99/42531 | 8/1999 |
| WO | WO-00/63265 | 10/2000 |
| WO | WO-00/63266 | 10/2000 |
| WO | WO-01/25307 | 4/2001 |
| WO | WO-01/72909 | 10/2001 |
| WO | WO-01/81483 | 11/2001 |
| WO | WO-03/089477 | 10/2003 |
| WO | WO-03/089487 | 10/2003 |
| WO | WO-2007/044767 | 4/2007 |
| WO | WO-2010/121791 | 10/2010 |

OTHER PUBLICATIONS

PCT International Preliminary Report on Patentability in PCT/EP2013/053887, dated Sep. 12, 2014, 5 pages.
PCT International Search Report in PCT/EP2013/053887, dated Jun. 4, 2013, 2 pages.

\* cited by examiner

*Primary Examiner* — Thao T Tran

(74) *Attorney, Agent, or Firm* — Servilla Whitney LLC

(57) ABSTRACT

Described is a solvent-based pigmented coating composition comprising (A) at least one binder comprising at least one acrylate polymer, polyurethane polymer, or a polyester, (B) at least one crosslinking agent selected from the group of blocked polyisocyanates and amino resins, (C) at least one pigment, and (D) at least one organic solvent selected from the group of alkyl acetates or alkyl monoglycol ethers, wherein alkyl is n-pentyl or n-hexyl, and wherein the solids content of the coating composition is at least 35% by weight.

2 Claims, No Drawings

PIGMENTED COATING MATERIAL AND PROCESS FOR PRODUCING A MULTI-COAT PAINT SYSTEM USING THE PIGMENTED COATING MATERIAL

CROSS-REFERENCE TO RELATED APPLICATIONS

This application is the National Stage entry of PCT/EP2013/053887, filed on Feb. 27, 2013, which claims priority to European Application Number 12157332.3, filed on Feb. 28, 2012, and U.S. Provisional Application Ser. No. 61/603,989 filed on Feb. 28, 2012, which are incorporated herein by reference in their entireties.

TECHNICAL FIELD

The present invention relates to pigmented coating materials comprising specific solvents. The present invention further relates to a process for producing multicoat paint systems using the pigmented coating composition.

BACKGROUND

The known solvent-containing coating materials, more particularly those known as basecoat and clearcoat materials, and the single-coat or multicoat, color and/or effect paint systems produced using them feature good performance properties.

The continually growing technical and esthetic requirements of the market, especially the requirements of the car makers and their customers, however, are necessitating continual ongoing development of the technical and esthetic level hitherto achieved.

More particularly it is necessary to provide new coating compositions which have a lower VOC as compared with the prior art, so that fewer VOC emissions occur in the production of corresponding multicoat paint systems, and, consequently, the production process can be made more environmentally safe. A particular way in which the VOC can be lowered is by increasing the solids content of the coating materials in question.

Reducing VOC emissions can also be accomplished, however, by a reduction, for example, in the film thicknesses of coating compositions that are used for producing multicoat paint systems, and especially of solventborne, unpigmented coating compositions.

Nowadays, for example, high-solids clearcoat materials (clearcoat materials with a high solids content of above 50%) are applied generally in film thicknesses of around 45-55 μm, in order to obtain effective leveling and a very good overall appearance. Reducing the clearcoat film thickness to 35-40 μm can lead to a lowering of VOC emissions by about 5 g per square meter of coated surface.

Besides the aspect of environmental safeness, however, it is critical that at the same time other technical properties and also the aesthetic properties of coating materials and of multicoat paint systems produced from them are retained, if not, indeed, improved.

In particular, the advantages achieved by means of the known basecoat and clearcoat materials in the production of multicoat paint systems are not to be lost, but instead are to be retained at least to the same extent and to a greater extent.

Multicoat paint systems comprising basecoat and clearcoat are widespread in the automotive industry. They are used on account of their outstanding profiles of properties, such as scratch resistance, chemicals resistance and weather resistance, and also their high gloss.

The high-solids (low-VOC) clearcoat materials that are used in the production of such multicoat paint systems for reasons of environmental protection, and which nevertheless possess the high scratch resistance required by the customer, are based predominantly on carbamate-containing binder systems, which in combination with monomeric crosslinking resins such as hexa(methoxymethyl)melamine (HMMM) or melamines with mixed etherification, and with further polymerizable binders, are able to form an impervious network.

The basecoat materials that are used in producing multicoat paint systems generally comprise a polymerizable binder and a crosslinker. The polymerizable binder here frequently possesses hydroxy-functional groups on a polymeric scaffold. Crosslinkers used are monomeric crosslinking resins such as hexa(methoxymethyl)melamine (HMMM) or melamines with mixed etherification.

Multicoat paint systems are produced, for example, by applying a clearcoat material, after having carried out preliminary application of a pigmented basecoat material and after a brief flash-off time without a baking step (wet-on-wet process), and then baking basecoat and clearcoat materials together.

In the context of the wet-on-wet process as well, the reduction of VOC emissions when producing multicoat paint systems possesses a high relevance. As a result of the switch from medium-solids basecoat systems, with a solids content between 20-30%, to what are called high-solids basecoat systems, with a solids content greater than 35% in the application-ready state (spray viscosity), a significant VOC reduction in the processing operation is achieved. Moreover, increasing the solids content by about 5% to 10% in the context of industrial coating operations already implies a massive saving in organic solvents that are used absolutely and are therefore emitted to the environment in the course of processing. A further reduction in overall solvent emissions can be accomplished by reducing the clearcoat film thickness.

A particular problem with the reduction in the clearcoat film thickness is that the leveling properties and hence also the optical quality of the multicoat paint systems produced are significantly lowered.

It would therefore be advantageous to have a pigmented coating composition, more particularly a basecoat material, which allows good leveling properties and also a very good overall appearance to the multicoat paint systems produced, even with low film thicknesses of clearcoat materials applied to the pigmented paint, but which, at the same time, does not result in any deterioration in other processing properties, applications properties and, in particular, technological properties of the coating compositions employed and also of the multicoat paint systems produced. It would be advantageous, furthermore, if the basecoat material itself had a high solids content, so as to make the production of multicoat paint systems even safer from an environmental standpoint.

SUMMARY

Provided are pigmented coating compositions which permit the production of multicoat paint systems having outstanding optical properties, more particularly leveling properties. In the context of the production of these high-quality multicoat paint systems, moreover, it is to be possible to apply the clearcoat materials used at just a low film thickness, and hence to contribute to a reduction in VOC emissions.

Another highly relevant factor was that the stated advantages can be ensured even in the case of pigmented coating compositions having a relatively high solids content and also, where appropriate, with a relatively high pigment/binder ratio at spray viscosity. At the same time, however, the advantages achieved through the known basecoat materials and the basecoats produced from them are not to be lost, but instead are to be retained at least to the same extent, and to a greater extent.

The corresponding basecoat materials and the basecoats produced from them are therefore to possess, in particular, good haze—that is, no haze on the gloss. Furthermore, the basecoats are to be free from film defects such as fissuring (mudcracking), areas of light/dark shading (clouds), and bits. Moreover, the resultant coatings are to have no optical defects such as, for example, sanding scars, and are to exhibit satisfactory adhesion to the clearcoat.

It has been found that the problems identified above could be solved by a solvent-based pigmented coating composition comprising
   (A) at least one acrylate polymer, polyurethane polymer and/or a polyester as binder,
   (B) at least one crosslinking agent selected from the group of the blocked polyisocyanates and amino resins,
   (C) at least one pigment and
   (D) at least one organic solvent selected from the group of the alkyl acetates or
alkyl monoglycol ethers with alkyl=n-pentyl or n-hexyl, the solids content of the coating composition being at least 35% by weight.

Coating compositions having a solids content of 35% or more are referred to as high-solids coating compositions. Accordingly the pigmented coating composition of the invention is a high-solids coating composition.

The pigmented coating composition identified above is also identified below as the coating composition of the invention and is, accordingly, subject matter of the present invention. red embodiments of the coating composition of the invention can be found in the description later on below.

Also provided is a process for producing a multicoat paint system, in which
   (1) at least one basecoat material is applied to a substrate,
   (2) a polymer film is formed from the basecoat material applied in stage (1),
   (3) at least one clearcoat material is applied to the resultant basecoat film and subsequently
   (4) the basecoat film is cured together with the clearcoat material applied in stage (3),
characterized in that a coating composition of the invention is used as basecoat material.

Further provided is a multicoat paint system produced by the process of the invention.

The invention also embraces substrates, especially those of metal and/or plastic, which have been coated with the multicoat paint system of the invention.

A further aspect of the invention is the use of the coating composition of the invention for automotive OEM finishing, for painting utility vehicles and for automotive refinish, for the coating of components for boat building and aircraft construction or of components for household and electrical appliances or parts thereof.

Surprisingly it has been found that the coating composition of the invention no longer exhibits the disadvantages of the prior art, but instead, when used to produce multicoat paint systems, and in spite of low clearcoat film thicknesses, it allows these multicoat paint systems to have very good overall appearances. The multicoat paint systems of the invention that are produced using the coating composition of the invention meet the technological and performance requirements typically imposed on an automobile finish and are nevertheless produced under environmentally safe conditions.

DETAILED DESCRIPTION

In one or more embodiments, the construction of the multicoat paint systems of the invention is such that first of all a primer has been applied to a substrate. Located above the primer is at least one coat of a primer-surfacer, and also at least one coat of a basecoat material, over which there is at least one coat of a clearcoat material. In one or more embodiments, just one of the stated coating compositions is used.

The coat system identified above is the coat system commonly employed in the automotive finishing segment. In one or more embodiments, the multicoat paint system of the invention, accordingly, is a multicoat automotive paint system.

It follows from what has been said above that in the context of the process of the invention, a primer and also a primer-surfacer are, applied before the basecoat material is applied. In one or more embodiments, as described later on below, the primer and primer-surfacer are each cured separately before the basecoat material is applied. In the context of the process of the invention, the coating composition of the invention is employed in each case as a basecoat material. However, it is also possible for it to be used additionally, for example, as a primer-surfacer.

The substrates are typically provided with a primer, which is applied by the customary methods, such as electrodeposition coating, dipping, knifecoating, spraying, rolling or the like. In one or more embodiments, the primer is cured at least partly or completely, more particularly completely, before primer-surfacer, basecoat material and clearcoat material are applied. The primer is cured typically by heating to a temperature between 80 and 170° C. for a time of 3 to 30 minutes.

In one or more embodiments, the multicoat paint system of the invention is produced on substrates made of metal and/or plastic, specifically of metal.

Atop the primer there is then applied at least one primer-surfacer, at least one basecoat material and at least one clearcoat material.

Primer-surface, basecoat material and clearcoat material are applied by means of customary methods for applying liquid coating compositions, such as, for example, dipping, knifecoating, spraying, rolling or the like, more particularly by spraying. In specific embodiments, preference is given to employing spray application techniques, such as, for example, compressed-air spraying, airless spraying, high-speed rotation, electrostatic spray application (ESTA), optionally in conjunction with hot spray application such as, for example, hot-air spraying. It is particularly advantageous to apply a basecoat material by ESTA in a first application and pneumatically in a second application.

In one or more embodiments, the primer-surfacer is cured at least partly or completely before basecoat material and clearcoat material are applied. The primer-surfacer is typically cured by heating to a temperature between 80 and 170° C. for a time of 3 to 30 minutes. In one or more embodiments, the applied basecoat material is flashed off briefly or dried briefly, generally at a temperature between 20 and less than 100° C. for a time of 1 to 15 minutes. After that the clearcoat material is applied.

The applied basecoat material and the applied clearcoat material are jointly cured thermally. Where the clearcoat material is also curable with actinic radiation, this is followed by an aftercure by exposure to actinic radiation.

Curing may take place after a certain rest time. It may have a duration of 30 seconds to 2 hours, particularly 1 minute to 1 hour, and more particularly 1 to 45 minutes. The rest time serves, for example, for leveling and for the degassing of the coating films, or for the evaporation of volatile constituents. The rest time may be assisted and/or shortened by the application at elevated temperature of up to 90° C. and/or by a reduced atmospheric humidity of less than 10 g water/kg air, provided that this does not entail any damage or alteration to the coating films, such as premature crosslinking, for instance.

Curing takes place typically at a temperature between 90 and 160° C. for a time of 5 to 90 minutes.

The stated temperatures should be understood in each case to be the actual temperatures of the coated substrate.

In one or more embodiments, for the drying and/or conditioning of the wet basecoat and of the wet clearcoat, thermal and/or convective methods are used, employing customary and known apparatus such as tunnel ovens, NIR and IR heaters, blowers and blowing tunnels. These forms of apparatus can also be combined with one another.

In one or more embodiments, in the multicoat paint systems of the invention, the basecoat generally has a dry film thickness of 3 to 40 micrometers, particularly from 5 to 30 micrometers, and very particularly from 7 to 25 micrometers. In one or more embodiments, the clearcoat may generally have a dry film thickness of 10 to 60 micrometers, more specifically up to 55 micrometers, more particularly up to 45 micrometers, very particularly up to 40 micrometers. Particularly preferred are ranges from 25 to 55 micrometers, more particularly from 30 to 45 micrometers and especially advantageously from 35 to 40 micrometers.

The other coating compositions that are used—i.e. the primers, the primer-surfacers, the optional further basecoat materials and the clearcoat materials, more particularly the clearcoat materials—may be the coating compositions that are known to the skilled person in this context and are generally available commercially. In one or more embodiments, the clearcoat materials are solvent-based clearcoat materials, possessing a solids content of at least 50%, based on the total weight of the clearcoat material. Clearcoat materials of this kind are also referred to in the context of the invention as high-solids clearcoat materials.

Component (A)

The pigmented coating composition of the invention may be cured thermally and accordingly comprises at least one polymer (A), as described below, as binder.

For the purposes of the present invention, "thermally curable" or the term "thermal curing" denotes the crosslinking of a layer of coating material (formation of a coating film) that takes place by chemical reaction of reactive functional groups, the energetic activation of this chemical reaction being possible by thermal energy. Different complementary functional groups may react with one another, and/or film formation derives from the reaction of autoreactive groups—that is, functional groups which react among one another with groups of their own kind. Examples of suitable complementary reactive functional groups and autoreactive functional groups are known, for example, from German Patent Application DE 199 30 665 A1, page 7, line 28, to page 9, line 24. This crosslinking may be self-crosslinking and/or external crosslinking. Where, for example, the complementary reactive or autoreactive functional groups are already present in a polymer used as binder, then self-crosslinking is present. External crosslinking is present, for example, when a polymer containing certain functional groups is reacted with a different crosslinking agent, possibly likewise polymeric, the crosslinking agent then containing reactive functional groups which are complementary to the reactive functional groups present in the organic polymer used. It is also possible for a polymer as binder to contain both self-crosslinking and externally crosslinking functional groups, and to then be combined with crosslinking agents.

The pigmented coating composition of the invention comprises at least one acrylate polymer, polyurethane polymer and/or a polyester as binder (A).

These polymers as binders are for example, as is known to the skilled person, random, alternating and/or block, linear and/or branched and/or comb (co)polymers of ethylenically unsaturated acrylate monomers (acrylate polymers), and also polyaddition resins (polyurethane polymers) and polycondensation resins (polyesters). For further details, refer to Römpp Lexikon Lacke and Druckfarben, page 457, entry headings "Polyaddition" and "Polyadditionsharze (Polyaddukte)" [Polyaddition resins (polyadducts)], and also pages 463 and 464, entry headings "Polykondensate" [Polycondensates], "Polykondensation" [Polycondensation] and "Polykondensationsharze" [Polycondensation resins], and also pages 73 and 74, entry heading "Bindemittel" [Binders].

The acrylate polymers are, as is known, referred to additionally as (meth)acrylate (co)polymers, with the expression (meth)acrylate making it clear that the polymers include acrylate and/or methacrylate monomers or consist of such monomers.

Among the stated polymers (A) as binders, the acrylate polymers and the polyesters, more particularly the acrylate polymers, have particular advantages and are therefore used with particular preference.

In one or more embodiments, the polymers (A) as binders contain thio, hydroxyl, N-methylamino-N-alkoxymethylamino, imino, carbamate, allophanate and/or carboxyl groups, particularly hydroxyl or carboxyl groups. In one or more specific embodiments, hHydroxyl groups are used. Via these functional groups it is then possible, for example, for crosslinking to take place with components which contain other functional groups, such as, anhydride, carboxyl, epoxy, blocked isocyanate, urethane, methylol, methylol ether, siloxane, carbonate, amino, hydroxyl and/or beta-hydroxyalkylamide groups, particularly epoxy, beta-hydroxylalkylamide, blocked isocyanate, urethane or alkoxymethylamino groups. Made possible more particularly is such crosslinking with the crosslinking agents (B) described later on below, and hence the externally crosslinking thermal curing of the pigmented coating composition of the invention.

In the case of coating compositions with, for example, proportional self-crosslinking, the groups present in the binders (A) may include more particularly methylol, methylol ether and/or N-alkoxymethylamino groups.

Complementary reactive functional groups which are particularly well suited to use in the coating compositions of the multicoat paint system of the invention are hydroxyl groups on the one hand and blocked isocyanate, urethane or alkoxymethylamino groups on the other.

The functionality of the polymers (A) as binders in respect of the above-described reactive functional groups may vary very widely and is guided in particular by the crosslinking density that is to be obtained, and/or by the functionality of the crosslinking agents employed in each case. In the case of the hydroxyl-containing polymers (A) as binders, for example, the OH number is 15 to 300, more particularly 20 to 250, very particularly 25 to 200, especially particulary 30 to 150 and more particularly 35 to 120 mg KOH/g. The OH number is determined, for the purposes of the present invention, in accordance with DIN 53240.

The above-described complementary functional groups can be incorporated into the polymers (A) as binders in accordance with the customary and known methods of polymer chemistry. This can be done, for example, through the incorporation of monomers which carry corresponding reactive functional groups, and/or by means of polymer-analogous reactions.

In one or more embodiments, suitable polymers (A) as binders have, for example, a number-average molecular weight of 2000 to 30 000 g/mol, specifically 10 000 to 20 000 g/mol. The molecular weight, however, may also be lower or higher. The molecular weight is determined by means of GPC analysis with THF (+0.1% acetic acid) as eluent (1 ml/min) on a styrene-divinylbenzene column combination. Calibration is carried out using polystyrene standards.

In one or more embodiments, the polymers (A) as binders are used in an amount of 5% to 35% by weight, more specifically of 6% to 30% by weight, especially of 8% to 20% by weight, based in each case on the total weight of the pigmented coating material of the invention.

Suitable acrylate polymers can be prepared by the methods known to the skilled person, using the olefinically unsaturated monomers that are known in this context and that have reactive functional groups (more particularly hydroxyl groups), generally in combination with monomers without reactive functional groups.

Examples of suitable olefinically unsaturated monomers containing reactive functional groups are as follows:

a) Monomers which carry at least one hydroxyl, amino, alkoxymethylamino, carbamate, allophanate or imino group per molecule, such as
  hydroxyalkyl esters of acrylic acid, methacrylic acid or another alpha,beta-olefinically unsaturated carboxylic acid that derive from an alkylene glycol which is esterified with the acid, or that are obtainable by reacting the alpha,beta-olefinically unsaturated carboxylic acid with an alkylene oxide such as ethylene oxide or propylene oxide, especially hydroxyalkyl esters of acrylic acid, methacrylic acid, ethacrylic acid, crotonic acid, maleic acid, fumaric acid or itaconic acid, in which the hydroxyalkyl group contains up to 20 carbon atoms, such as 2-hydroxyethyl, 2-hydroxypropyl, 3-hydroxypropyl, 3-hydroxybutyl, 4-hydroxybutyl acrylate, methacrylate, ethacrylate, crotonate, maleate, fumarate or itaconate; or hydroxycycloalkyl esters such as 1,4-bis(hydroxymethyl)cyclohexane, octahydro-4,7-methano-1H-indenedimethanol or methylpropanediol monoacrylate, monomethacrylate, monoethacrylate, monocrotonate, monomaleate, monofumarate or monoitaconate; reaction products of cyclic esters, such as, for example, epsilon-caprolactone, and its hydroxyalkyl or cycloalkyl esters;
  olefinically unsaturated alcohols such as allyl alcohol;
  polyols such as trimethylolpropane monoallyl or diallyl ether or pentaerythritol monoallyl, diallyl or triallyl ether;
  reaction products of acrylic acid and/or methacrylic acid with the glycidyl ester of an alpha-branched monocarboxylic acid having 5 to 18 carbon atoms per molecule, more particularly of a Versatic® acid, or, instead of the reaction product, an equivalent amount of acrylic and/or methacrylic acid, which is then reacted, during or after the polymerization reaction, with the glycidyl ester of an alpha-branched monocarboxylic acid having 5 to 18 carbon atoms per molecule, more particularly of a Versatic® acid;
  aminoethyl acrylate, aminoethyl methacrylate, allylamine or N-methyliminoethyl acrylate;
  N,N-di(methoxymethyl)aminoethyl acrylate or methacrylate or N,N-di(butoxymethyl)aminopropyl acrylate or methacrylate;
  (meth)acrylamides, such as (meth)acrylamide, N-methyl-, N-methylol-, N,N-dimethylol-, N-methoxymethyl-, N,N-di(methoxymethyl)-, N-ethoxymethyl- and/or N,N-di(ethoxyethyl)-(meth)acrylamide;
  acryloyloxy- or methacryloyloxyethyl, -propyl or -butyl carbamate or allophanate; further examples of suitable monomers containing carbamate groups are described in patent publications U.S. Pat. No. 3,479,328, U.S. Pat. No. 3,674,838, U.S. Pat. No. 4,126,747, U.S. Pat. No. 4,279,833 or U.S. Pat. No. 4,340,497.

b) Monomers which carry at least one acid group per molecule, such as
  acrylic acid, beta-carboxyethyl acrylate, methacrylic acid, ethacrylic acid, crotonic acid, maleic acid, fumaric acid or itaconic acid;
  olefinically unsaturated sulfonic or phosphonic acids or their partial esters;
  mono (meth)acryloyloxyethyl maleate, succinate or phthalate; or
  vinylbenzoic acid (all isomers), alpha-methylvinylbenzoic acid (all isomers) or vinylbenzenesulfonic acid (all isomers).

c) Monomers containing epoxide groups, such as the glycidyl ester of acrylic acid, methacrylic acid, ethacrylic acid, crotonic acid, maleic acid, fumaric acid or itaconic acid, or allyl glycidyl ether.

Monomers of the above-described kind that are of higher functionality are generally not used or only used in minor amounts. For the purposes of the present invention, minor amounts of monomers of relatively high functionality mean those amounts which do not lead to crosslinking or gelling of the copolymers, particularly of the (meth)acrylate copolymers.

Examples of suitable olefinically unsaturated monomers without reactive functional groups include alkyl esters of acrylic acid, methacrylic acid or another alpha,beta-olefinically unsaturated carboxylic acid, vinylaromatic compounds, and mixtures of these monomers.

The polyurethane polymers that can likewise be used as polymers (A) are obtained, for example, in a manner known to the skilled person by reacting
  at least one polyol selected from the group consisting of polyester polyols and polyether polyols, specifically having a number-average molecular weight of 10 000 to 20000 g/mol, and
  at least one polyisocyanate, and also
  if desired, at least one compound containing at least one isocyanate-reactive functional group and at least one (potentially) anionic group in the molecule, if desired, at least one further compound containing at least one isocyanate-reactive functional group, and if desired, at least one compound with a number-average molecular weight of 60 to 600 g/mol, containing hydroxyl and/or amino groups in the molecule.

Polyurethane polymers of this kind are described for example in European patent applications EP 228003 and EP 574417.

Polyurethane polymers of this kind are obtained for example by using, as the isocyanate component, isocyanates that are typically employed in the paint industry sector, such as, for example, hexamethylene diisocyanate, octamethylene diisocyanate, decamethylene diisocyanate, dodecamethylene diisocyanate, tetradecamethylene diisocyanate, trimethylhexane diisocyanate, tetramethylhexane diisocyanate, isophorone diisocyanate, 2-isocyanatopropylcyclohexyl isocyanate, dicyclohexylmethane 2,4'-diisocyanate, dicyclohexylmethane 4,4'-diisocyanate, 1,4- or 1,3-bis(isocyanatomethyl)cyclohexane, 1,4- or 1,3- or 1,2-diisocyanatocyclohexane, 2,4- or 2,6-diisocyanato-1-methylcyclohexane, diisocyanates derived from dimer fatty acids, as sold under the trade name DDI 1410 by Henkel, 1,8-diisocyanato-4-isocyanatomethyloctane, 1,7-diisocyanato-4-isocyanatomethylheptane or 1-isocyanato-2-(3-isocyanatopropyl)cyclohexane, or tetramethylxylylene diisocyanates (TMXDI) or mixtures of these polyisocyanates, particularly tetramethylxylylene diisocyanate (TMXDI) and/or isophorone diisocyanate, preferably isophorone diisocyanate.

In one or more embodiments, as chain extenders with hydroxyl and/or amino groups trimethylolpropane and diethanolamine are used.

Likewise suitable as polyurethane resins (A) are those known as acrylated polyurethane resins, which are obtainable in a manner known to the skilled person by polymerizing ethylenically unsaturated monomers in the presence of a polyurethane resin. In this case it is possible to use polyurethane resins without double bonds and/or polyurethane resins with double bonds.

As binders it is also possible to use acrylated polyurethane resins having pendant and/or terminal double bonds, especially those with pendant and/or terminal ethenylarylene groups.

The acrylated polyurethane resins with pendant and/or terminal double bonds may be obtained by reacting a polyurethane prepolymer which contains at least one free isocyanate group with a compound which has at least one ethylenically unsaturated double bond and one NCO-reactive group, more particularly a hydroxyl group or an amino group.

The acrylated polyurethane resins with pendant and/or terminal double bonds may also be obtained by reacting a polyurethane prepolymer which contains at least one NCO-reactive group, more particularly at least one hydroxyl group or one amino group, with a compound which has at least one ethylenically unsaturated double bond and one free isocyanate group.

Also useful as binder polymers (A) are graft copolymers which are obtainable by polymerizing olefinically unsaturated monomers in the presence of the acrylated polyurethane resins with pendant and/or terminal double bonds.

Use is made in particular of graft copolymers which comprise a hydrophobic core of at least one copolymerized olefinically unsaturated monomer and a hydrophilic shell of at least one hydrophilic acrylated polyurethane. Also suitable, however, are graft copolymers which comprise a hydrophobic core of at least one hydrophobic acrylated polyurethane and a hydrophilic shell of at least one copolymerized olefinically unsaturated monomer.

Suitable acrylated polyurethane resins and also graft copolymers prepared from them are described in, for example, WO 01/25307, page 5 line 14 to page 45 line 4, and EP-B-787 159, page 2 line 27 to page 7 line 13.

The polyesters likewise suitable as polymers (A) may be saturated or unsaturated, more particularly saturated. Polyesters of this kind and their preparation, and also the components which can be used for this preparation, are known to the skilled person and are described in EP-B-787 159, for example.

The polymers in question are more particularly polymers prepared using polyhydric organic polyols and polybasic organocarboxylic acids. These polyols and polycarboxylic acids are linked with one another by esterification, in other words by means of condensation reactions. Correspondingly, the polyesters are generally assigned to the group of the polycondensation resins. Depending on type, functionality and proportions used, and ratios of the starting components, linear or branched products, for example, are obtained. Whereas linear products are formed principally when using difunctional starting components (diols, dicarboxylic acids), the use of alcohols of relatively high functionality, for example, (with an OH functionality, this being the number of OH groups per molecule, of more than 2) produces branching. It is of course also possible to make proportional use of monofunctional components during the preparation, such as monocarboxylic acids, for example. For the preparation of polyesters it is also possible, as is known, instead of or as well as the corresponding organic carboxylic acids, to use the anhydrides of the carboxylic acids, more particularly the anhydrides of the dicarboxylic acids. Likewise possible is preparation through the use of hydroxycarboxylic acids or the lactones that are derived from the hydroxycarboxylic acids by intramolecular esterification.

Suitable diols are, for example, glycols, such as ethylene glycol, propylene glycol, butylenes glycol, butane-1,4-diol, hexane-1,6-diol, neopentyl glycol, and other diols, such as 1,4-dimethylolcyclohexane or 2-butyl-2-ethyl-1,3-propanediol.

Suitable alcohols of relatively high functionality (OH functionality more than 2) are, for example, trimethylolpropane, glycerol and pentaerythritol.

In one or more embodiments, the acid component of a polyester generally comprises dicarboxylic acids or anhydrides thereof having 2 to 44, particularly 4 to 36, carbon atoms in the molecule. Suitable acids are, for example, o-phthalic acid, isophthalic acid, terephthalic acid, tetrahydrophthalic acid, cyclohexanedicarboxylic acid, succinic acid, adipic acid, azelaic acid, sebacic acid, maleic acid, fumaric acid, glutaric acid, hexachloroheptane-dicarboxylic acid, tetrachlorophthalic acid and/or dimerized fatty acids. Instead of these acids it is also possible to use their anhydrides, where they exist. It is additionally possible to use carboxylic acids of relatively high functionality, having 3 or more carboxyl groups (and/or the corresponding anhydrides), an example being trimellitic anhydride. Use is frequently also made, proportionally, of monocarboxylic acids, such as unsaturated fatty acids, for example.

Hydroxycarboxylic acids which can be used are, for example, hydroxycaproic acid, hydroxybutyric acid, hydroxydecanoic acid and/or 12-hydroxystearic acid.

Lactones which can be used are, for example, the beta-, gamma-, delta- and epsilon-lactones that are known per se, more particularly epsilon-caprolactone.

As well as the monomeric compounds described above it is also possible for example to use starting products that are already in polymeric form, for example, as diols, the polyester diols which are known per se and are obtained by reacting a lactone with a dihydric alcohol.

The above-described polymers (A) as binders, in other words the acrylate polymers, polyurethane polymers and/or polyesters, can be used per se or else in combination with one another in the coating composition of the invention.

Besides the acrylate polymers, polyurethane polymers and/or polyesters (A) it is also possible to use further polymers as binders. Corresponding binders that are customarily used in the automotive industry segment in pigmented coating materials, more particularly basecoat materials, are known to the skilled person and can be easily selected by said person.

As an example, partially hydrolyzed polyvinyl esters are cited as further random, alternating and/or block, linear and/or branched and/or comb (co)polymers of ethylenically unsaturated monomers. Examples of further polyaddition resins and polycondensation resins are alkyds, polylactones, polycarbonates, polyethers, epoxy resin-amine adducts, polyureas, polyamides or polyimides.

Crosslinking Agent (B)

The pigmented coating composition of the invention further comprises at least one crosslinking agent (B) selected from the group of the blocked polyisocyanates and amino resins. Advantageously the crosslinking agent (B) is an amino resin, especially advantageously a melamine-formaldehyde resin.

The blocked polyisocyanates here may be based in principle on any organic compounds that are known in this context to the skilled person and that have at least two isocyanate groups per molecule, examples being the polyisocyanates identified earlier on above in the context of the description of the polyurethane polymers. More particularly it is also possible to use the known trimers of the stated polyisocyanates (isocyanurates). Trimeric hexamethylene diisocyanate is used in specific embodiments. Typical blocking agents in this context are, for example, phenols, alcohols, oximes, pyrazoles, amines and CH-acidic compounds. In one or more embodiments, blocking agents have a deblocking temperature of less than 130° C. In one or more embodiments, blocking agents are, for example caprolactam, butanone oxime, acetone oxime, diethyl malonate, dimethylpyrazole or phenol. The blocking reaction is carried out typically by reaction of the free NCO groups with the stated blocking agents in the presence of catalysts such as, for example, dibutyltin dilaurate or tin(II) bis(2-ethylhexanoate). The blocking agents and the corresponding reactions are known to the skilled person. A particular blocked polyisocyanate is dimethylpyrazole-blocked trimeric hexamethylene diisocyanate.

Amino resins employed are the amino resins that are typically employed in the paint industry sector. In one or more embodiments, methanol- and/or butanol-etherified melamine-formaldehyde resin, examples being the products available commercially under the names Cymel®, Resimene®, Maprenal® and Luwipal®, especially Resimene® 747 and Resimene® 755 are used.

In one or more embodiments, the amount of crosslinking agent is 5% to 30% by weight and more particularly 7% to 20% by weight, based in each case on the total weight of the pigmented coating material of the invention.

Pigment (C)

The pigmented coating composition of the invention further comprises at least one pigment. Pigments, as is known, are colorants in powder and/or platelet form that are commonly used in coating compositions.

In one or more embodiments, the pigment is selected from the group consisting of organic and inorganic, specifically inorganic, color-imparting, effect-imparting, color- and effect-imparting, magnetically shielding, electrically conductive, corrosion-inhibiting, fluorescent and phosphorescent pigments. In one or more embodiments, the color- and/or effect-imparting pigments (color and/or effect pigments) are used.

In one or more embodiments, the pigmented coating composition of the invention comprises at least one effect pigment, specifically at least one metal flake pigment. In addition to the effect pigment or pigments, the pigmented coating composition of the invention may also further comprise at least one or more additional pigments, examples being color pigments.

Examples of suitable effect pigments, which may also impart color, are metal flake pigments, more particularly aluminum flake pigments, such as commercial stainless steel bronzes, more particularly commercial aluminum bronzes, and also nonmetallic effect pigments, such as, for example, pearlescent pigments and interference pigments, platelet-shaped effect pigments based on iron oxide, or liquid-crystalline effect pigments. For further details refer to Römpp Lexikon Lacke and Druckfarben, page 176, entry heading "Effektpigmente" [Effect pigments] and pages 380 and 381, entry headings "Metalloxid-Glimmer-Pigmente" [Metal oxide-mica pigments] to "Metallpigmente" [Metallic pigments].

Aluminum bronzes or aluminum flake pigments are used in particular. Use is made both of untreated types, which are available commercially, for example, under the name Stapa® Metallux (from Eckart), and of treated types, especially silanized types, which are described, for example, in WO 01/81483 and are available commercially, for example, under the name Hydrolan® (from Eckart).

In one or more embodiments, the metal flake pigment has a thickness of 200 to 2000 nm and more particularly 500 to 1500 nm.

In one or more embodiments, the metal flake pigment has an average particle size of 10 to 50 and more particularly of 13 to 25 micrometers (ISO 13320-1 by Cilas (instrument 1064)).

Suitable organic and/or inorganic color pigments are the pigments that are typically employed in the paint industry.

Examples of suitable inorganic color pigments are white pigments such as titanium dioxide, zinc white, zinc sulfide or lithopones; black pigments such as carbon black, iron manganese black or spinel black; chromatic pigments such as chromium oxide, chromium oxide hydrate green, cobalt green or ultramarine green, cobalt blue, ultramarine blue or manganese blue, ultramarine violet or cobalt violet and manganese violet, red iron oxide, cadmium sulfoselenide, molybdate red or ultramarine red; brown iron oxide, mixed brown, spinel phases and corundum phases or chromium orange; or yellow iron oxide, nickel titanium yellow, chromium titanium yellow, cadmium sulfide, cadmium zinc sulfide, chromium yellow or bismuth vanadate.

Examples of suitable organic color pigments are monoazo pigments, disazo pigments, anthraquinone pigments, benzimidazole pigments, quinacridone pigments, quinophthalone pigments, diketopyrrolopyrrole pigments, dioxazine pigments, indanthrone pigments, isoindoline pigments, isoindolinone pigments, azomethine pigments, thioindigo pigments, metal complex pigments, perinone pigments, perylene pigments, phthalocyanine pigments or aniline black.

For further details refer to Römpp Lexikon Lacke and Druckfarben, Georg Thieme Verlag, 1998, pages 180 and 181, entry headings "Eisenblau-Pigmente" [Iron blue pigments] to "Eisenoxidschwarz" [Black iron oxide], pages 451 to 453, entry headings "Pigmente" [Pigments] to "Pigmentvolumenkonzentration" [Pigment volume concentration], page 563, entry heading "Thioindigo-Pigmente" [Thioindigo pigments], page 567, entry heading "Titandioxid-Pigmente" [Titanium dioxide pigments], pages 400 and 467, entry heading "Natiirlich vorkommende Pigmente" [Naturally occurring pigments], page 459, entry heading "Polycyclische Pigmente" [Polycyclic pigments], page 52, entry headings "Azomethinpigmente" [Azomethine pigments], and "Azopigmente" [Azo pigments], and page 379, entry heading "Metallkomplex-Pigmente" [Metal complex pigments].

The amount of the pigments may vary very widely and is guided primarily by the depth of the color and/or the intensity of the effect that are to be established, and also by the dispersibility of the pigments in the pigmented coating compositions of the invention. In one or more embodiments, the fraction of pigments is 0.5% to 50% by weight, more particularly 0.5% to 40% by weight, very particularly 1% to 30% by weight, particularly advantageously 2% to 20% by weight, based in each case on the total weight of the coating composition.

In one or more embodiments, where the coating composition of the invention is a primer-surfacer, the pigment content is 0.5% to 49% by weight, based on the total weight of the coating composition. In one or more embodiments, in the case of solid-color paints, a pigment content of 1% to 49% by weight isused, based on the total weight of the coating composition. In one or more embodiments, in the case of a basecoat material, a metallic basecoat material, the pigment content is 0.5% to 40% by weight, more particularly 1% to 30% by weight, very particularly 2% to 20% by weight, based in each case on the total weight of the coating material.

Organic Solvent (D)

The pigmented coating composition of the invention comprises at least one organic solvent (D). This is an alkyl acetate or an alkyl monoglycol ether with alkyl=n-pentyl or n-hexyl, i.e. n-pentyl acetate, n-hexyl acetate, n-pentyl glycol and n-hexyl glycol. Advantageously there is exactly one of the solvents stated solvents present. For obtaining the advantages according to the invention for the pigmented coating composition, particularly the acquisition of outstanding overall appearance in multicoat paint systems produced using the pigmented coating composition, the presence of the solvent (D) is essential.

In one or more embodiments, the organic solvent (D) selected from the group of the alkyl acetates or alkyl monoglycol ethers with alkyl=n-pentyl or n-hexyl is used in the coating compositions of the invention in an amount of 1% to 10% by weight, more particularly of 3% to 7% by weight, based in each case on the total weight of the coating composition.

Besides the specific organic solvent (D) there may also be further organic solvents (L), different from the solvent (D), present in the pigmented coating composition of the invention. In one or more embodiments, there are further solvents (L) present. Suitable further solvents are all of the solvents that are typically used in the paint industry, examples being alcohols different from the solvent (D), glycol ethers different from the solvent (D), esters different from the solvent (D), ether esters and ketones, aliphatic and/or aromatic hydrocarbons, such as, for example, acetone, methyl isobutyl ketone, methyl ethyl ketone, butyl acetate, 3-butoxy-2-propanol, ethyl ethoxypropionate, butyl glycol, butyl glycol acetate, butanol, dipropylene glycol methyl ether, butyl glycolate, xylene, toluene, Shellsol® T, Pine Oil 90/95, Solventnaphtha®, Shellsol® A, Solvesso, benzine 135/180.

In one or more embodiments, the amount of further solvents (L) is selected such that the pigmented coating composition overall has a solvent fraction (solvents (D) and further solvents (L)) of 40% to 65% by weight, particularly at least 45% by weight, more particularly at least 50% by weight, with more particular advantage at least 55% by weight, based in each case on the total amount of the pigmented coating composition of the invention. Particularly preferred ranges are from 40% to 62% by weight, more particularly 45% to 62% by weight, very particularly from 50% to 62% by weight and especially advantageously from 55% to 62% by weight, based in each case on the total amount of the pigmented coating composition of the invention.

In one or more embodiments, the solids content of the coating composition is at least 35%, specifically 35% to 60%, more specifically up to 55%, more particularly up to 50% and with particular advantage up to 45%. Particularly preferred ranges are from 38% to 60%, more particularly 38% to 55%, very particularly 38% to 50%, and especially advantageously 38% to 45%.

The solids fraction is determined in the context of the present invention, unless otherwise indicated, in accordance with DIN ISO 3251, with an initial sample mass of 1.0 g, as for example 1.0 g of the coating composition of the invention, with a test duration of 60 minutes at a temperature of 125° C.

In one or more embodiments, under the stated conditions, pigmented coating compositions of the invention have a viscosity at 23° C. of 16 s to 35 s and more particularly of 18 to 25 s efflux time from the Ford 3 Cup. In the context of the present invention, a viscosity within this range is referred to as spray viscosity (processing viscosity). As is known, coating compositions are applied at spray viscosity—in other words, under the conditions then prevailing, they possess a viscosity which in particular is not too high, so as to allow effective application.

This means that the setting of the spray viscosity is important in order to allow a coating material to be applied at all by spraying techniques, and to ensure that a complete, uniform coating film is able to form on the substrate that is to be coated. A particular advantage is that the coating material of the invention has a high solids content at spray viscosity, and so there is no need for further dilution with environmentally detrimental organic solvents.

The coating composition of the invention, moreover, is solvent-based. Solvent-based coating compositions are compositions which comprise organic solvents. This means that, during the preparation of the coating composition, water is not added explicitly, but instead water is included, for example, only as a residual fraction or contaminant from other constituents present in the coating composition, such as as a result of residual water fractions in organic solvents, for example. With particular advantage, solvent-based means that the water fraction is less than 2% by weight, particulary less than 1% by weight, based in each case on the total weight of the coating composition. In one or more specific embodiments, the coating composition is water-free.

Further Constituents

In the coating compositions of the invention it is also possible, advantageously, to use polymer microparticles (M). Suitable polymer microparticles are described in, for example, EP-A-480 959, page 3 line 36 to page 4 line 35, WO 96/24619, WO 99/42529, EP-B-1 173 491, EP-B-1 185 568, WO 03/089487, WO 03/089477, WO 01/72909 and WO 99/42531. The polymer microparticles may be used in particular to control the flow, the evaporation behavior, and the attitude towards incipient dissolution by the clearcoat material.

Suitable polymer microparticles typically have a number-average molecular weight of 2000 to 100 000 g/mol. The molecular weight is determined by means of GPC analysis with THF (+0.1% of acetic acid) as eluent (1 ml/min) on a styrene-divinylbenzene column combination. Calibration is carried out with polystyrene standards.

Suitable polymer microparticles also typically have an average particle size of 0.01 to 10 µm, in particular of 0.01 to 5 µm, and very particularly of 0.02 to 2 µm, in accordance with ISO 13320-1.

In one or more embodiments, polymer microparticles contain reactive functional groups which are able to react with the functional groups of the crosslinking agent. In particular the polymer microparticles contain hydroxyl groups. In this case the polymer microparticles preferably have a hydroxyl number of 5 to 150 mg KOH/g in accordance with DIN 53240. Hydroxyl-containing polymer microparticles are described in WO 01/72909, for example.

Crosslinked polymer microparticles are obtainable by, for example, subjecting a mixture of:

(a) an ethylenically unsaturated monomer which contains one ethylenically unsaturated group per molecule, or a mixture of such monomers, and (b) an ethylenically unsaturated monomer which contains at least two ethylenically unsaturated groups per molecule, or a mixture of such monomers, to polymerization in an aqueous phase in the presence, if desired, of emulsifiers or in the presence, if desired, of a carrier resin, preferably a polyester, and then transferring the aqueous polymer microparticle dispersion obtained in this way into an organic solvent or a mixture of organic solvents.

In one or more embodiments, preference is given to polymer microparticles which have been prepared using components containing ionic and/or polar groups, preferably hydroxyl groups and/or carboxyl groups. The components (a) and (b) ought in general to contain between 1% and 20%, particularly between 3% and 15%, by weight of ionic and/or polar groups.

In order to obtain sufficiently crosslinked polymer microparticles it is generally sufficient to use 0.25 to 1.2 mol, particularly 0.3 to 1 mol, of component (b) per mole of component (a).

Alternatively the polymer microparticles (M) used in the basecoat materials may be prepared directly in organic phase.

Polymer microparticles used with preference are obtainable, for example, by subjecting a mixture of:

(c) an ethylenically unsaturated monomer (M1) which contains at least one reactive group (G1) per molecule, or a mixture of such monomers (M1), and (d) if desired, an ethylenically unsaturated monomer (M2) which contains at least one non-(G1) reactive group (G2) per molecule, or a mixture of such monomers (M2), and (e) if desired, a further ethylenically unsaturated monomer (M3) or a mixture of such monomers (M3) to polymerization in an organic solvent in the presence, if desired, of a carrier resin, preferably a polyester.

Examples of suitable monomers (M1) are monomers which contain hydroxyl groups, carbamate groups, amino groups, alkoxymethylamino groups, allophanate groups or imino groups, especially hydroxyl groups, as reactive groups.

The monomers (M1) with the reactive groups (G1) here may also be prepared by reacting two compounds of which a first compound contains a reactive group and at least one ethylenically unsaturated double bond, and the other compound contains a group reactive with the reactive groups of the first compound, and optionally an ethylenically unsaturated double bond.

Examples of suitable monomers (M2) are monomers which contain carboxyl groups.

Suitable monomers (M3) are the so-called neutral monomers that are typically employed, i.e. ethylenically unsaturated monomers which contain no reactive groups.

The polymer microparticles (M) may be used in the basecoat materials of the multicoat paint system of the invention for example in an amount of 3% to 30% by weight, more particularly of 4% to 20% by weight, based in each case on the total weight of the basecoat material.

In one particular embodiment of the present invention, the coating composition of the invention, in so far as the polymeric microparticles described are present, comprises a cumulative fraction of the above-described binders (A) and the microparticles (M) ((A)+(M)) of 10% to 35% by weight, more particularly 12% to 30% by weight, based in each case on the total amount of the coating composition. In one or more embodiments, the weight ratio here of (A) to (M) is between 1 and 2, more particularly between 1.2 and 1.8.

Besides the above-described components, the basecoat material may comprise customary and known auxiliaries and additives in typical amounts, 0.5% to 40% by weight and more particularly 0.5% to 30% by weight, more particularly 0.5% to 15% by weight, based in each case on the total weight of the respective coating material.

Examples of suitable auxiliaries and additives are organic and inorganic fillers, examples being talc or fumed silicas, and/or further customary auxiliaries and additives, such as, for example, antioxidants, deaerating agents, wetting agents, catalysts, dispersants, emulsifiers, rheological assistants such as flow control agents, thickeners, antisag agents and thixotropic agents, waxes, slip additives, reactive diluents, free-flow aids, siccatives, biocides, additives for enhancing substrate wetting, additives for enhancing surface smoothness, matting agents, free-radical scavengers, light stabilizers, the above-described UV absorbers with an absorption maximum below 370 nm and/or HALS, corrosion inhibitors, flame retardants or polymerization inhibitors, as are described in the book "Lackadditive" [Additives for Coatings] by Johan Bieleman, Wiley-VCH, Weinheim, N.Y., 1998, in detail. In one or more embodiments, the auxiliaries and additives are rheological assistants, deaerating agents, wetting agents, dispersants, UV absorbers and free-radical scavengers. In one or more specific embodiments, the auxiliaries and additives are UV absorbers and wetting agents, and also fillers, among which fumed silicas are preferred.

In one particular embodiment, the coating composition of the invention contains a cumulative fraction of 12% to 30% by weight of polymer microparticles (M) and binders (A) as described above, the weight ratio (A) to (M) being very particularly between 1.2 and 1.8, 7% to 20% by weight of at least one crosslinking agent (B), 3% to 20% by weight of at least one pigment (C), 1% to 10% by weight of at least one special solvent (D), and also further organic solvents (L), in an amount such that the coating composition of the invention has a total amount ((D)+(L)) of 40% to 65% by weight. The stated weight fractions are stated in each case in relation to the total coating composition.

The invention is elucidated further below by means of examples.

EXAMPLES

Preparation of the Inventive and Comparative Basecoat Materials V-1 to V-12

The inventive and comparative basecoat materials V-1 to V-12 are based on the metallic basecoat material P1, which is described below and is known from patent application DE 10 2006 053 776 A1.

1. Preparation of the Basecoat Material P1
1.1 Preparation of an Acrylate Polymer (A) as Binder In a reactor, 13.239 parts by weight of Solvesso 100 are introduced and heated to 167° C. The reactor is placed under a pressure of 0.35 bar and over a period of 4 hours is charged simultaneously with a monomer mixture consisting of 2.149 parts by weight of acrylic acid, 10.765 parts by weight of hydroxyethyl acrylate, 11.484 parts by weight of 2-ethylhexyl acrylate, 11.484 parts by weight of butyl acrylate and 14.353 parts by weight of styrene and with an initiator mixture consisting of 0.719 part by weight of di-tert-butyl peroxide and 11.120 parts by weight of a solution of dicumyl peroxide in Solvesso 100 (50% strength). The mixture is then held at the above temperature and pressure for an hour, before, over a period of one hour, 21.530 parts by weight of epsilon-caprolactone are added. The mixture is cooled to 150° C. and held at a pressure of 0.35 bar for 1.5 hours. The reaction mixture is cooled and is adjusted with Solvesso 100 to a solids content of 75%. The resulting acrylate resin has an acid number of 23 mg KOH/g and an OH number of 73 mg KOH/g, based in each case on the solids content.

1.2 Preparation of a Paste of an Aluminum Effect Pigment (C)

The paste is prepared from 40 parts by weight of a commercial non-leafing aluminum effect pigment paste of the silver dollar type, with an average particle size of 14 micrometers (Metallux 2192 from Eckart), 45 parts by weight of butyl glycol acetate and 15 parts by weight of the acrylate polymer (A) described under 1.1 as binder, with stirring.

1.3 Preparation of Further Constituents
a) Preparation of Polymeric Microparticles In a reactor, first of all 5.762 parts by weight of xylene, 5.762 parts by weight of toluene and 0.179 part by weight of methanesulfonic acid are introduced and heated to 104° C. then 80.615 parts by weight of 12-hydroxystearic acid are run into the reactor and the mixture is boiled under reflux at 171° C., with the water of reaction being removed. The reaction is over when an acid number of 35 is reached. After the vehicle resin produced in this way has been cooled, the solids content is adjusted with solvent naphtha to 80 parts by weight.

Subsequently, in a reactor, 43.16 parts by weight of solvent naphtha, 0.08 part by weight of N,N-dimethylcocosamine and 1.00 part by weight of ethyl acetate are introduced and heated to 104° C. The reactor is placed under a pressure of 0.69 bar and is charged over the course of 2 hours simultaneously with a monomer mixture consisting of 27.63 parts by weight of methyl methacrylate, 3.85 parts by weight of 2-hydroxypropyl methacrylate, 0.83 part by weight of glycidyl methacrylate, 12.81 parts by weight of the above-described vehicle resin, 1.51 parts by weight of methacrylic acid and 1.52 parts by weight of octyl mercaptan and with an initiator mixture consisting of 2.28 parts by weight of tert-butyl peroxy-2-ethylhexanoate and 5.13 parts by weight of solvent naphtha. The mixture is then held at the above temperature and pressure for 3 hours, after which it is cooled and is adjusted with solvent naphtha to a solids content of 41%. The resulting polymer microparticles have an acid number of 10 mg KOH/g and an OH number of 48 mg KOH/g, based in each case on the solids content.

b) Preparation of Stabilized Inorganic Particles

In a receiver vessel, 10.00 parts by weight of the acrylate polymer described under 1.1 as binder, 6.00 parts by weight of Degussa Aerosil® 380 (commercial hydrophilic fumed silica from Degussa AG with a specific surface area (BET) of 380 m²/g, an average primary particle size of 7 nm and an $SiO_2$ content of >=99.8% by weight, based on the calcined substance), 41.7 parts by weight of solvent naphtha, 41.7 parts by weight of butyl acetate and 0.6 part by weight of a fatty acid ester as stabilizer, having a non-volatile fraction of 96.2% in 2 hours at 130° C., an OH number of 50 mg KOH/g and an acid number of 17.2 mg KOH/g, based in each case on 130° C. solids content, containing 6-hydroxycaproic acid, hydroxyvaleric acid, lauric acid and polyethylene glycol (for example the commercial, fatty acid ester-based wetting additive Solsperse® 39000 from Th. Goldschmidt) are mixed and dispersed.

c) Preparation of a Wax Dispersion 6.00 parts by weight of the polyethylene wax EVA 1 from BASF AG (a commercial polyethylene wax based on an ethylene/vinyl acetate copolymer, with a melting point of 87-92° C., an Ubbelohde drop point of about 95° C. and a mass-average molecular weight (by viscometry) of about 6500 g/mol) and 40.00 parts by weight of xylene are dissolved with slow stirring at 100° C. With further stirring, the solution is cooled to 70° C. and admixed slowly with 54.00 parts by weight of butyl acetate (technical rate, approximately 85% form), with desired wax precipitation beginning. With further stirring, the dispersion is left to cool further to 35° C.

The basecoat material P1 is prepared by mixing the following constituents in the stated order and homogenizing the resulting mixtures:

- 19 parts by weight of the wax dispersion described under 1.3, c),
- 18 parts by weight of the polymer microparticles described under 1.3 a),
- 15.0 parts by weight of the stabilized inorganic particles described under 1.3 b),
- 11.0 parts by weight of the binder (A) described under 1.1,
- 13.2 parts by weight of a commercial, monomeric hexamethoxymethyl melamine resin (B) (commercial product Maprenal® MF 900 from Surface Specialities Germany GmbH & Co. KG),
- 0.5 part by weight of a commercial wetting additive based on an amine resin-modified acrylic copolymer without silicone additions, having a viscosity of 150-280 mPa s at 23° C. (cone/plate, shear rate 25 s$^{-1}$) and an active ingredient content of 70% (commercial product Additol XL 480 from Cytec Surface Specialities),
- 1.5 parts by weight of a commercial, acidic, amine-neutralized catalyst based on dodecylbenzenesulfonic acid (commercial product Nacure® 5225 from King Industries Speciality Chemicals),
- 18 parts by weight of the paste of an aluminum effect pigment (C) described under 1.2,
- 3.8 parts by weight of butanol.

The basecoat material P1 possesses a solids content (1 h, 120° C.) of 39.8% and has a viscosity of 23-24 s efflux time from the Ford 3 cup (spray viscosity).

2. Preparation of Further Basecoat Materials

The basecoat materials specified in Table 1 below were prepared by the procedure identified above for basecoat material P1, but in each case replacing 5% by weight of the butyl acetate used in the preparation of the basecoat material P1 by the same amount of the particular solvent indicated. This therefore means that basecoat material V-5 indicated in the table corresponds to basecoat material P1 identified above.

TABLE 1

Basecoat materials

| | Basecoat material | | | | | |
|---|---|---|---|---|---|---|
| | V-1 | V-2 | V-3 | V-4 | V-5 | V-6 |
| Solvent | n-butanol | n-pentanol | n-hexanol | n-octanol | n-butyl acetate | n-pentyl acetate |

| | Basecoat material | | | | | |
|---|---|---|---|---|---|---|
| | V-7 | V-8 | V-9 | V-10 | V-11 | V-12 |
| Solvent | n-hexyl acetate | n-octyl acetate | n-butyl glycol | n-pentyl glycol | n-hexyl glycol | n-octyl glycol |

V-1 to V-5, V-8, V-9 and V-12 are the comparative basecoat materials,

V-6, V-7, V-10 and V-11 are the inventive basecoat materials with addition of an organic solvent selected from the group of the alkyl acetates or alkyl glycol ethers with alkyl=n-pentyl or n-hexyl.

The comparative and inventive basecoat materials V-1 to V-4 and V-6 to V-12, like the comparative basecoat material V-5, have a spray viscosity of 23-24 s Ford cup 3 efflux cup and a solids content (1 h, 120° C.) between 39% and 40%.

Production of the Comparative and Inventive Multicoat Paint Systems F-1 to F-13

For the testing of the leveling qualities, first of all multicoat paint systems were produced using the basecoat materials F-1 to F-12 in a customary and known way on test panels with dimensions of 30×20 cm. For this purpose, cathodically electrocoated test panels were coated with a commercial, conventional, gray, polyester-based primer-surfacer from BASF Coatings AG, after which the resulting primer-surfacer films were flashed off for 5 minutes at 20° C. and a relative humidity of 65% and baked in a forced-air oven at 165° C. panel temperature for 5 minutes.

After the test panels had cooled to 20° C., in a first series, the basecoat materials V-1 to V-12 were applied by automated ESTA spray application, to give, after subsequent curing, a dry film thickness of 17-19 micrometers, corresponding to the hiding power. The basecoat films were subsequently flashed off vertically for 5 minutes and coated with a commercial High-Solid-1-component clearcoat material from BASF Coatings AG, to give, after subsequent curing, a dry film thickness of 37-39 micrometers. After that, the basecoat films and the clearcoat films applied over them were jointly baked at a panel temperature of 140° C. for 10 minutes. This gave the comparative and inventive multicoat paint systems F-1 to F-12.

Additionally, as a further comparative multicoat paint system, F-13 was produced, for which the comparative basecoat material V-5 was applied with a higher clearcoat film thickness of 52 micrometers (resulting dry film thickness).

Table 2 again summarizes the basecoat and clearcoat film thicknesses of the comparative multicoat paint systems F-1 to F-5, F-8, F-9, F-12 and F-13 and also those of the inventive multicoat paint systems F-6, F-7, F-10 and F-11.

TABLE 2

Basecoat and clearcoat film thicknesses of the comparative and inventive multicoat paint systems F-1 to F-13*:

| | Multicoat paint system | | | | | | | | | | | | |
|---|---|---|---|---|---|---|---|---|---|---|---|---|---|
| | F-1 | F-2 | F-3 | F-4 | F-5 | F-6 | F-7 | F-8 | F-9 | F-10 | F-11 | F-12 | F-13 |
| Basecoat film thickness | 17 | 18 | 19 | 18 | 17 | 18 | 17 | 19 | 18 | 18 | 19 | 17 | 18 |
| Clearcoat film thickness | 38 | 39 | 39 | 38 | 37 | 38 | 37 | 39 | 38 | 38 | 39 | 37 | 52 |

*figures in micrometers

Testing of the Comparative Multicoat Paint Systems F-1 to F-5, F-8, F-9, F-12 and F-13 and of the Inventive Multicoat Paint Systems F-6, F-7, F-10 and F-11

The leveling (CF value) of the comparative multicoat paint systems F-1 to F-5, F-8, F-9, F-12 and F-13 and that of the inventive multicoat paint systems F-6, F-7, F-10 and F-11 were determined using a "Wave Scan DOI" instrument from Byk/Gardner. Higher values here correspond to better leveling.

TABLE 3

CF values of the comparative and inventive multicoat paint systems F-1 to F-13

| | Multicoat paint system | | | | | | | | | | | | |
|---|---|---|---|---|---|---|---|---|---|---|---|---|---|
| | F-1 | F-2 | F-3 | F-4 | F-5 | F-6 | F-7 | F-8 | F-9 | F-10 | F-11 | F-12 | F-13 |
| CF value | 42 | 47 | 46 | 43 | 50 | 55 | 54 | 51 | 49 | 53 | 54 | 45 | 55 |

The results compiled in Table 3 show clearly that the CF values obtained for the inventive multicoat paint systems F-6, F-7, F-10 and F-11 at low clearcoat film thicknesses of 37-39 micrometers are significantly higher than for the comparative multicoat paint systems F-1 to F-5, F-8, F-9 and F-12. The CF values obtained for the inventive multicoat paint systems F-6, F-7, F-10 and F-11 are located at the level of multicoat paint systems obtained using known basecoat materials (V-5) and with clearcoat film thicknesses of more than 50 micrometers (comparative multicoat paint system F13).

The coating compositions and multicoat paint systems of the invention, accordingly, have the advantage that even at significantly lower clearcoat film thicknesses the overall appearance achieved is at an optically high level. The systems according to the invention consequently meet the quality requirements of the automotive industry, and at the same time allow a massive saving in materials and solvent emissions. The advantage of the systems of the invention in terms of cost saving and environmental awareness is evident with corresponding clarity.

What is claimed is:

1. A solvent-based pigmented coating composition comprising
   (A) at least one binder comprising at least one acrylate polymer, polyurethane polymer, or polyester,
   (B) at least one crosslinking agent selected from the group of blocked polyisocyanates and amino resins,
   (C) at least one pigment, and
   (D) at least one organic solvent that is n-pentyl acetate, n-pentyl glycol, or n-hexyl glycol,
   wherein the solids content of the coating composition is at least 35% by weight.

2. A multicoat paint system for a substrate, the system comprising:
   a clearcoat having a dry film thickness in the range of 10 to 40 micrometers;
   a basecoat having a dry film thickness in the range of 3 to 40 micrometers; and
   optionally a primer coat and a primer-surfacer coat below the basecoat;
   wherein the basecoat is formed from a solvent-based pigmented coating composition comprising:
   (A) at least one binder comprising at least one acrylate polymer, polyurethane polymer, or polyester,
   (B) at least one crosslinking agent selected from the group of blocked polyisocyanates and amino resins,
   (C) at least one pigment, and
   (D) a first organic solvent that is n-pentyl acetate, n-pentyl glycol, or n-hexyl glycol and a second organic solvent comprising butyl acetate;
   wherein the solids content of the solvent-based pigmented coating composition is at least 35% by weight.

* * * * *